(12) United States Patent
Fakoorian et al.

(10) Patent No.: US 11,943,791 B2
(45) Date of Patent: Mar. 26, 2024

(54) LOWER LAYER CONTROL SIGNAL FOR DOWNLINK POSITIONING REFERENCE SIGNAL

(71) Applicant: Apple Inc., Cupertino, CA (US)

(72) Inventors: Seyed Ali Akbar Fakoorian, San Diego, CA (US); Wei Zeng, Saratoga, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 17/499,545

(22) Filed: Oct. 12, 2021

(65) Prior Publication Data

US 2022/0132493 A1 Apr. 28, 2022

Related U.S. Application Data

(60) Provisional application No. 63/105,180, filed on Oct. 23, 2020.

(51) Int. Cl.
*H04W 72/51* (2023.01)
*G01S 5/00* (2006.01)
*H04L 5/00* (2006.01)
*H04W 72/23* (2023.01)
*H04W 80/02* (2009.01)

(52) U.S. Cl.
CPC ........ *H04W 72/51* (2023.01); *G01S 5/0036* (2013.01); *H04L 5/0051* (2013.01); *H04W 72/23* (2023.01); *H04W 80/02* (2013.01)

(58) Field of Classification Search
CPC .............................. H04W 72/51; H04W 72/23
USPC ......................................................... 370/329
See application file for complete search history.

(56) References Cited

U.S. PATENT DOCUMENTS

2018/0069618 A1* 3/2018 Loehr ............... H04W 72/1263

OTHER PUBLICATIONS

Revised SID: Study on NR Positioning Enhancements, CATT, Intel Corporation, 3GPP TSG RAN Meeting #88e, RP-200928 Jun. 29-Jul. 3, 2020, 4 pages.
3rd Generation Partnership Project; Technical Specification Group Radio Access Network; NR; Radio Resource Control (RRC) protocol specification (Release 16), 3GPP TS 38.331 V16.2.0, Sep. 2020, 921 pages.
3rd Generation Partnership Project; Technical Specification Group Radio Access Network; NR; Medium Access Control (MAC) protocol specification (Release 16), 3GPP TS 38.321 V16.2.1, Sep. 2020, 154 pages.
3rd Generation Partnership Project; Technical Specification Group Radio Access Network; NR; Physical layer procedures for data (Release 16), 3GPP TS 38.214 V16.3.0, Sep. 2020, 166 pages.

* cited by examiner

*Primary Examiner* — Angel T Brockman
(74) *Attorney, Agent, or Firm* — Kilpatrick Townsend & Stockton LLP

(57) ABSTRACT

The present application relates to devices and components including apparatus, systems, and methods for lower-layer activation and release of dynamic downlink positioning reference signals.

20 Claims, 7 Drawing Sheets

LOWER LAYER CONTROL SIGNAL FOR DOWNLINK POSITIONING REFERENCE SIGNAL

RELATED APPLICATIONS

This application claims priority to U.S. Provisional Patent Application No. 63/105,180 filed on Oct. 23, 2020, the disclosure of which is herein incorporated by reference in its entirety for all purposes.

BACKGROUND

Third Generation Partnership Project (3GPP) Technical Specifications (TSs) define standards for wireless networks. These TSs includes numerous details relating to calculating a position of a user equipment (UE). Work in this field is ongoing.

DETAILED DESCRIPTION

Figure 1:
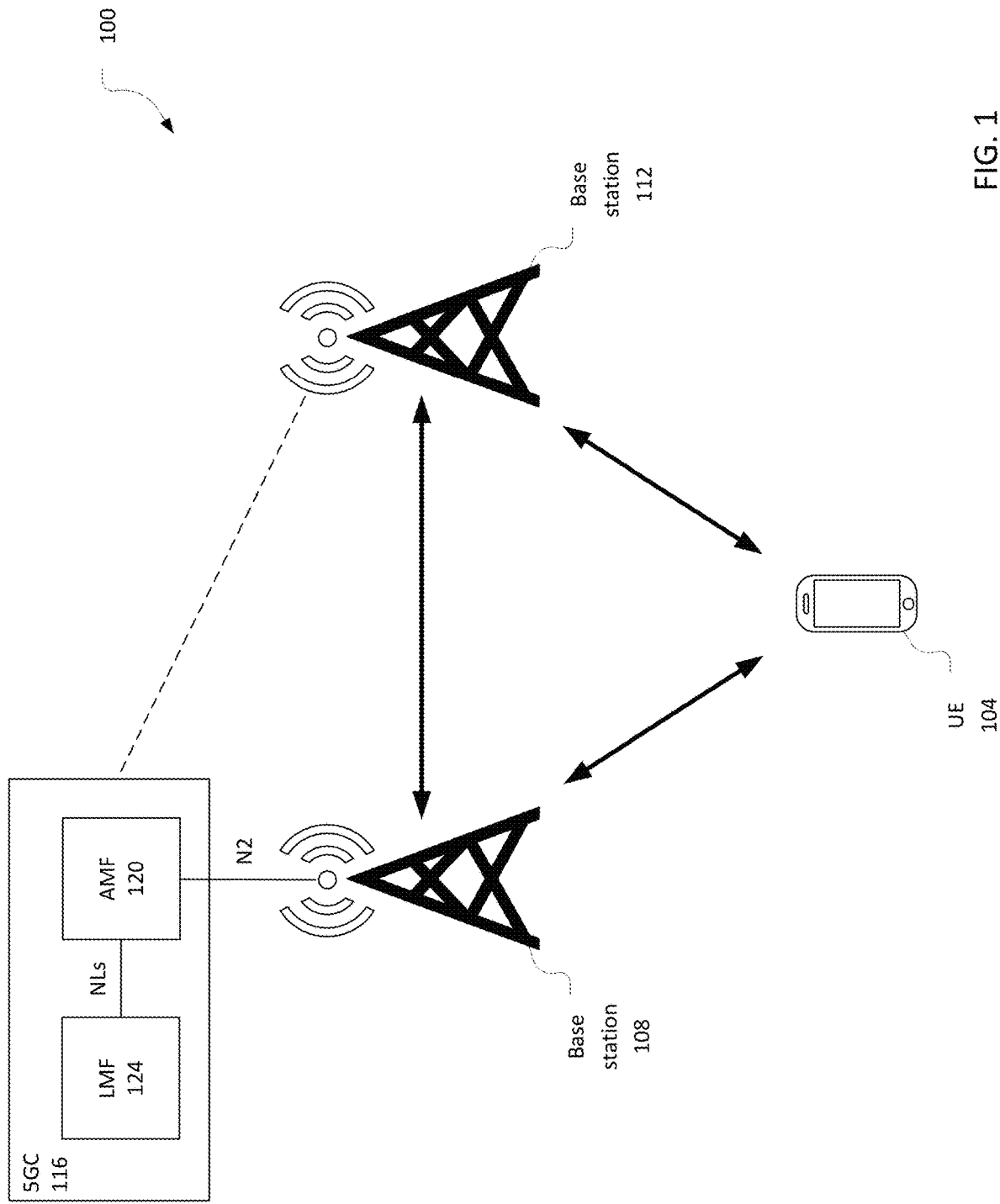
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base stations such as, for example, base station 108 and base station 112. The UE 104 and the base stations 108/112 may communicate over air interfaces compatible with 3GPP TSs such as those that define Long Term Evolution (LTE) and Fifth Generation (5G) new radio (NR) system standards. The base stations 108/112 may provide one or more LTE evolved universal terrestrial radio access (E-UTRA) cells to provide E-UTRA user plane and control plane protocol terminations toward the UE 104, or one or more 5G NR cells to provide NR user plane and control plane protocol terminations toward the UE 104. In general, a base station that provides a 5G NR air interface may be referred to as a gNB and the base station that provides an LTE air interface may be referred to as an eNB.

While the radio access network as shown with two base stations, in other embodiments additional numbers of base stations and other access nodes may be present. For example, in some embodiments one or more of the base stations 108/112 may include distributed antennas within various transmission-reception points (TRPs).

The base station 108 may be coupled with the 5G core network (5GC) 116 by a backhaul connection. The base station 112 may be coupled with the 5GC either directly or through the base station 108. The 5GC 116 may provide the UE 104 with various communication services. The 5GC 116 may include network elements that offer various data and telecommunications services to customers/subscribers (for example, a user of UE 104) who are connected to the 5GC 116 via the base stations 108/112. The components of the 5GC 116 may be implemented in one physical node or separate physical nodes.

The base station 108 may be coupled with an access and mobility function (AMF) 120. The AMF 120 may be responsible for registration management (e.g., for registering UE 104, etc.), connection management, reachability management, mobility management, lawful interception of AMF-related events, and access authentication and authorization. The AMF 120 may be coupled with a location management function (LMF) 120 via an NLs interface.

The AMF 120 may send a location services request to the LMF 124 with respect to the UE 104. The location services request may be initiated by the AMF 120 or another entity. In response to the request, the LMF 124 may transfer assistance data to the UE 104 to assist with positioning operations. The assistance data may be tailored to the type of positioning operation that is to be performed. In general, the assistance data may include information about access nodes in the vicinity of the UE 104 and reference signal parameters corresponding to reference signals transmitted by the access nodes, which form a basis for the positioning measurements. The reference signal parameters may include, for example, bandwidth, frequency, periodicity, etc.

For observed time difference of arrival (OTDOA) positioning, the LMF 124 may configure the UE 104 with assistance data of downlink positioning reference signals (DL-PRSs) of access nodes in the vicinity of the UE 104. The access nodes in the vicinity of the UE 104 may include base stations 108/112 and potentially other access nodes including, but not limited to, other base stations or transmission-reception points (TRPs)/transmission points (TPs), such as remote radio heads (RRHs) or DL-PRS-only TPs. One access node, for example, base station 108, may control one or more TRPs/TPs to support PRS-based positioning operations.

The UE 104 may perform PRS measurements based on assistance data of the PRSs received from the LMF 124. In some embodiments, the PRS measurements may be the basis for reference signal time difference (RSTD) measurements. An RSTD measurement may include a measured time offset between DL-PRSs from different access nodes. The UE 104 may then report the RSTD measurement results to the LMF 124. The LMF 124 may use a multilateration technique to determine the position of the UE 104 based on the RSTD measurements and knowledge of the locations of the access nodes transmitting the PRSs.

In some embodiments, the assistance data may be provided to the UE 104 in one or more information elements (IEs) that provide assistance data with respect to a reference cell (for example, the cell provided by serving base station such as base station 108) and one or more neighbor cells (for example, cells provided by base station 112) to support the RSTD measurements.

3GPP study items have been issued to identify and evaluate positioning techniques, downlink/uplink PRSs, signaling and procedures to improve accuracy and network/device efficiency and to reduce latency. RP-200928, Revised SID: Study on NR Positioning Enhancements, CATT, Intel Corporation (Jun. 22, 2020).

Embodiments described herein provide lower-layer triggering of DL-PRS resources that may advance one or more of the objectives identified in 3GPP study items such as, for example, RP-200928. "Lower layers," as used herein may refer to layers of the 3GPP communication protocol stack at or below the media access control (MAC) layer. Thus, lower layers include the MAC and physical (PHY) layers. Conversely, "higher layers," as used herein may refer to layers of the 3GPP communication protocol stack at or above the radio resource control (RRC) layer.

In legacy networks, PRS resources are periodic and configured by the higher layers. All UEs in a legacy network may be configured to measure DL-PRS signals regardless of service type are required positioning accuracy. This may result in an increase to the network overhead and reduction of the UE efficiency.

The lower-layer control signaling described by embodiments of this disclosure may provide the ability to dynamically indicate DL-PRS resources for specific UEs as needed. In this manner, the base station 108 may determine when it would be beneficial for the UE 104 to receive more PRS receptions and may respond accordingly. This may increase UE efficiency, reduce latency, increase accuracy, and in some scenarios, increase network efficiency.

Consider, for example, a case in which the UEs of a network are configured with DL-PRS resources with a large periodicity. If a legacy network determines that increased accuracy or reduce latency is required, the network may update the configuration of the broadcast DL-PRS resources to increase the frequency by, for example, providing the configuration with a shorter periodicity. While this may increase accuracy and reduce latency, it may also come at the cost of network and UE efficiency.

Embodiments of this disclosure, on the other hand, enable the base station 108 to determine that the UE 104 (or a set of UEs that includes UE 104) would benefit from higher positioning accuracy or lower latency. The base station 108 may then provide lower-layer control signaling to dynamically activate DL-PRS resources for a period of time only for those specific UEs. In this manner, the base station 108 may target the additional resources to the UEs that would benefit from them and may do so only for the time period needed. Signaling and procedures to enable this operation are described in more details to follow.

Figure 2:
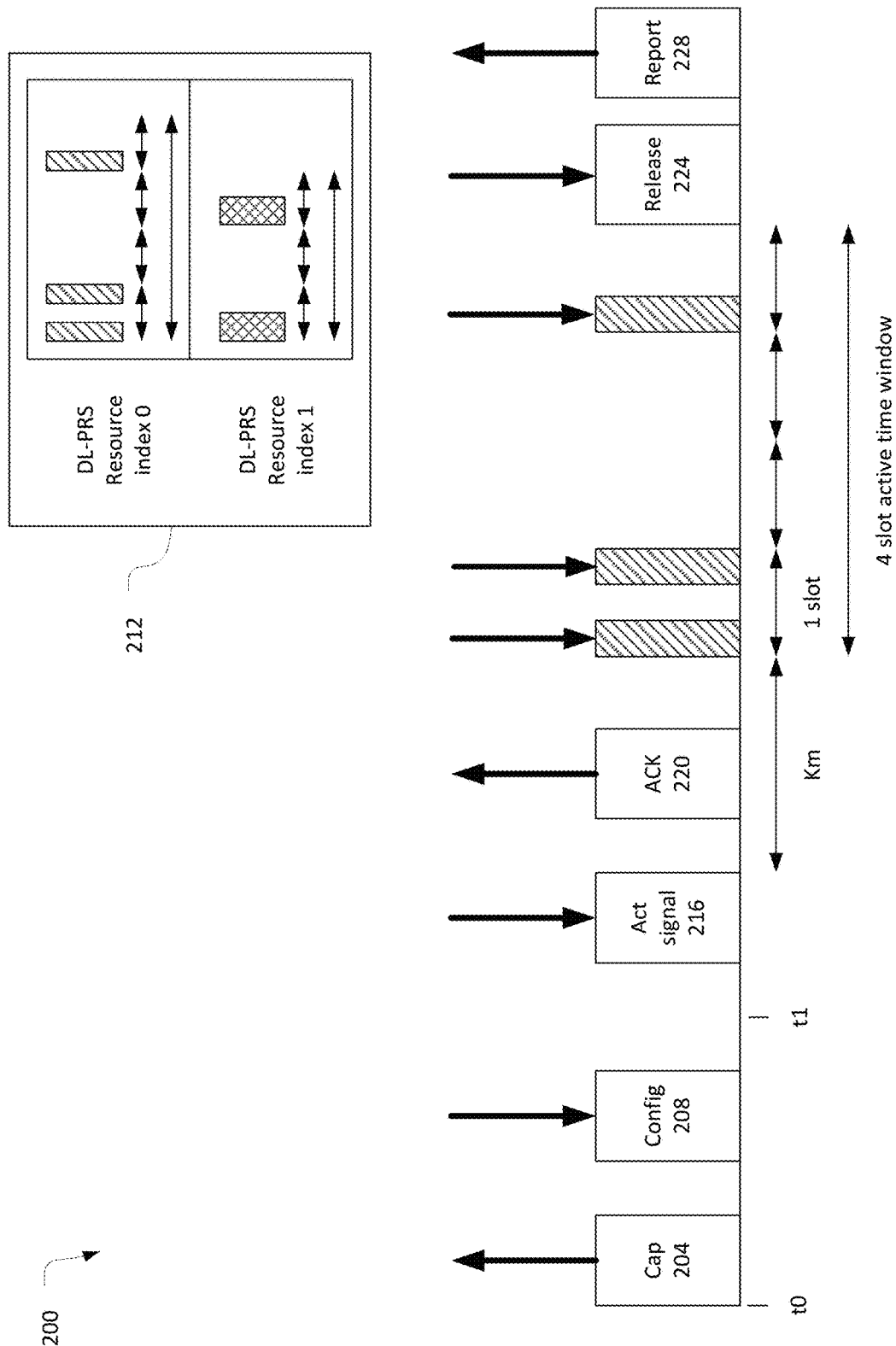
FIG. 2 illustrates a signaling diagram in accordance with some embodiments.

FIG. 2 illustrates a signaling diagram 200 in accordance with some embodiments. Signaling diagram 200 may illustrate various signals and operations performed by the UE 104 and the base station 108 with respect to dynamic DL-PRS operation. Transmissions in the uplink direction (for example, from the UE 104 to the base station 108) are shown in FIG. 2 by arrows pointing upward, and transmissions in the downlink direction (for example, from the base station 108 to the UE 104) are shown in FIG. 2 by arrows pointing downward.

At t0, the signaling diagram 200 includes the UE 104 transmitting a capability message (Cap) 204. In various embodiments, the capability message 204 may include indications that the UE 104 is capable of or information related to performing positioning measurement operations based on dynamic DL-PRS activated or released by lower-layer control signaling. For example, in some embodiments, the capability message 204 may include a minimum timing (K_min) between an end of the lower-layer control signaling and a start of receiving a DL-PRS activated by the lower-layer control signaling. In various embodiments, the minimum timing may be based on UE capability with respect to a minimum subcarrier spacing (SCS) of a component carrier (CC) carrying downlink control information (DCI) and SCS of CC carrying the dynamic DL-PRS. The minimum timing may be indicated in a number of symbols, slots, or other time-domain parameter.

In some embodiments, the capability message 204 may include an indication of a maximum number of DL PRS resources supported by the UE 104 for positioning measurements/report when the UE 104 supports lower-layer DL-PRS triggering. The measurements may include, for example, reference signal received power (RSRP) or RSTD measurements. At least two options for this capability report may be provided.

In a first option, the UE 104 may report a plurality of different numbers in the capability message 204. For example, the UE 104 may include a first number, N1, that indicates a number of DL-PRS resources that are supported when no dynamic DL-PRS resources are triggered; a second number, N2, of dynamic DL-PRS resources supported in an inactive state; and a third number, N3, of dynamic DL-PRS resources supported in an active state. The active/inactive states of the dynamic DL-PRS resources will be described in further detail below.

In a second option, the UE 104 may report a single number that includes all DL-PRS resources that are supported. This may include, for example, broadcast and dynamic DL-PRS resources.

The signaling diagram 200 includes the UE 104 receiving a configuration message (Config) 208. In some embodiments, the configuration message 208 may be a higher-layer signaling message such as, for example, RRC signaling. The configuration message 208 may configure the UE with one or more DL-PRS resources or DL-PRS resource sets. For example, in some embodiments, the configuration message 208 may configure the UE 104 with configuration parameters corresponding to a plurality of DL-PRS resources, with each DL-PRS resource configuration having independent periodicity or time/frequency occurrences for the corresponding DL-PRS resources. For example, the configuration message 208 may configure the UE 104 with configuration 212.

In one example, as generally illustrated in FIG. 2, configuration 212 may configure two DL-PRS resources. First DL-PRS resources, associated with DL-PRS resource index 0, may include first configuration parameters and second DL-PRS resources, associated with DL-PRS resource index 1, may include second configuration parameters.

The first configuration parameters may include, for example, a three-slot periodicity, with DL-PRS occurrences within the first two consecutive slots of the three-slot period. Furthermore, each DL-PRS occurrence may be defined by, for example, 10 physical resource blocks and symbols 0-6. The first configuration parameters may further include an active time window of four slots.

The second configuration parameters may include, for example, eight two-slot periodicity, with DL-PRS occurrences within a first slot of the two-slot period. The DL-PRS occurrence may be defined by, for example, six physical resource blocks and symbols 0-8. The second configuration parameters may further include an active time window of three slots.

It will be understood that the number of configured DL-PRS resources, the specific configuration parameters, etc. are given only as examples and do not limit embodiments described herein.

In some embodiments, the configuration message 208, and resulting configuration 212, may be specific to one UE (for example, UE 104) or a set of UEs having a common characteristic (for example, a common mobility status).

Upon configuration, the DL-PRS resources may be in an inactive state. The DL-PRS resources may remain in the inactive state until later activation or triggering by a lower-layer control signal as described herein. As used herein, "activating" or "triggering" DL-PRS resources be synonymous. Both may refer to transitioning inactive DL-PRS resources to active DL-PRS resources.

At some point, for example t1, the base station 108 may detect an event that indicates the UE 104 or network would benefit from increased accuracy or reduced latency with respect to the position of the UE 104. In some embodiments, the event may be based on signaling from the 5GC 116, services requested or provided to the UE 104, or conditions/context of the radio access network managed by the base station 108. Based on the event, the base station 108 may transmit a lower-layer control signal (Act signal) 216 to activate DL-PRS resources in a dynamic manner. The lower-layer control signal 216 may be transmitted through a physical downlink control channel (PDCCH).

In some embodiments, the lower-layer control signal 216 may be a UE-specific downlink control information (DCI), a group-common DCI, or a MAC (CE). The lower-layer control signal 216 may indicate which DL-PRS resources are activated by including one or more indices of DL-PRS resources or DL-PRS resource sets. For example, if the lower-layer control signal 216 includes a DL-PRS resource index, the UE 104 may determine that the DL-PRS resources associated with that index are to be transitioned from the inactive state to an active state. Similarly, if the lower-layer control signal 216 includes a DL-PRS resource set index, the UE 104 may determine that the DL-PRS resources within a set associated with the set index are to be transitioned from the inactive state to the active state. With reference to FIG. 2, the lower-layer control signal 216 may include an indication of DL-PRS resource index 0.

In some embodiments, the lower-layer control signal 216 may include additional information to supplement, or override, configuration information. For example, in some embodiments, the lower-layer control signal 216 may include an indication of length of an active time window, for example, a period of time in which the indicated DL-PRS resources are to be activated, after which they are to be transitioned to the inactive state.

In some embodiments, new DCI fields may be introduced (for example, in UE-specific or GC-DCI) or existing DCI fields may be implicitly used or reinterpreted (for example, in UE-specific DCI) to indicate the DL-PRS resources or resource sets that are activated. For example, in some embodiments a specific DCI type may be used to activate or release DL-PRS resources. The base station 108 may scramble cyclic redundancy check (CRC) bits of the DCI with a radio network temporary identifier (RNTI) that is to indicate that the DCI of a DL-PRS type. Thus, when the UE 104 uses the RNTI to descramble the CRC bits, the UE 104 may know that the DCI is of the DL-PRS type. In this situation, the DCI may also know that certain fields of the DCI may be interpreted consistent with a DL-PRS context. For example, because DCI of the DL-PRS type does not schedule data, the hybrid automatic repeat request (HARQ) number field may not be utilized. Therefore, in some embodiments the HARQ number field may be reinterpreted in DCI of the DL-PRS type to provide an indication of the DL-PRS resource (or resource set) index.

In some embodiments, the lower-layer control signal 216 may include a timing indication, K_m, which indicates a symbol/slot after an end of the PDCCH carrying the lower-layer control signal 216 until the symbol/slot where the UE 104 is to receive the first occasion of an activated DL-PRS resource. K_m may not be less than K_min indicated in the capability message 204.

In some embodiments, the UE 104 may transmit an acknowledgment message (ACK) 220 to acknowledge receipt of the lower-layer control signal 216. The acknowledgment message 220 may be transmitted through a MAC CE or physical uplink control channel (PUCCH).

After K_m symbols/slots, DL-PRS resources associated with DL-PRS resource index 0 may be activated, with DL-PRS signals being transmitted in activated occurrences. In some embodiments, the DL-PRS signals may be transmitted by one or more access nodes, including, for example, access nodes other than the base station 108.

The UE 104 may determine the DL-PRS resources are deactivated after the active time window indicated by the lower-layer control signal 216 or associated with the indicated DL-PRS resource in configuration 212.

In some embodiments, instead of relying on an active time window being signaled or configured, the base station 108 may transmit another lower-layer control signal (Release) 224 to release the DL-PRS resources. Similar to the lower-layer control signal 216, the lower-layer control signal 224 may be UE specific DCI, GC-DCI, or a MAC CE that includes one or more indices that correspond to the DL-PRS resources that are to be released, for example, the resources that are to be transitioned from the active state to the inactive state. In some embodiments, the lower-layer control signal 224 may be associated with the lower-layer control signal 216. In these situations, the lower-layer control signal 224 may be considered to indicate that all DL-PRS resources activated by lower-layer control signal 216 should be released. In other embodiments, only the indices indicated by the lower-layer control signal 224 may be released.

The signaling diagram 200 may further include a measurement report (Report) 228. The measurement report 228 may be based on measurements performed on the dynamic DL-PRS received during the duration window. In various embodiments, the measurements may be RSRP/RSTD measurements. The measurement report 228 may include the RSRP/RSTD measurements directly or one or more metrics/indications derived from those measurements.

A DL-PRS dynamically triggered by a lower-layer control signal, such as that discussed above with respect to FIG. 2, may result in a potential collision with another downlink transmission. For example, the dynamic DL-PRS may be scheduled to be transmitted on one or more symbols that overlap with symbols upon which the other downlink transmission is also scheduled. Various embodiments describe techniques that the base station 108 and UE 104 may employ to address these situations.

In a first embodiment, a dynamic DL-PRS, triggered by a lower-layer control signal, may potentially collide with a broadcast DL-PRS (for example, a regular or legacy DL-PRS). The base station 108 may determine that the dynamic DL-PRS is associated with a relatively higher priority than the broadcast DL-PRS. This may be due, in part, to the triggering of the dynamic DL-PRS representing a more recent decision by the network based on, for example, a condition detected by the network that prompts the activation of the dynamic DL-PRS. The broadcast DL-PRS, on the other hand, is activated by higher-layer signaling that may not represent the current state of the network. In these embodiments, the base station 108 may cancel at least part of the broadcast DL-PRS transmissions. For example, in some embodiments, transmission of the broadcast DL-PRS may be canceled in all symbols within an active time window of the DL-PRS. The active time window may be determined based on a lower-layer activation signal, configuration, or a lower-layer release signal. In other embodiments, the broadcast DL-PRS may be canceled only in symbols that overlap with the activated dynamic DL-PRS resources.

In another embodiment, a dynamic DL-PRS, triggered by a lower-layer control signal, may potentially collide with a semi-persistent (SP) DL-PRS, which may be configured by RRC and activated by a MAC CE. The base station 108 may determine that the dynamic DL-PRS is associated with a relatively higher priority than the SP DL-PRS. Similar to above, this may be due, in part, to the triggering of the dynamic DL-PRS representing a more recent decision by the network based on, for example, the condition detected by the network that prompts the activation of the dynamic DL-PRS. This may especially be the case when the lower-layer control signal that activates the dynamic DL-PRS is a DCI. In these embodiments, the base station 108 may cancel at least part of the SP DL-PRS transmissions. For example, in some embodiments, transmission of the SP DL-PRS may be canceled in all symbols within an active time window of the DL-PRS. The active time window may be determined based on a lower-layer activation signal, configuration, or a lower-layer release signal. In other embodiments, the SP DL-PRS may be canceled only in symbols that overlap with the activated dynamic DL-PRS resources.

In another embodiment, a dynamic DL-PRS, triggered by a lower-layer control signal, may potentially collide with a configured DL transmission. For example, the dynamic DL-PRS may potentially collide with a CSI-RS or an semi-persistent scheduled (SPS) physical downlink shared channel (PDSCH). In these embodiments, one or more options may be used.

In a first option, the base station 108 may drop, and the UE 104 may not expect to receive, the configured DL transmission (for example, the configured SPS-PDSCH or CSI-RS). Similar to above, a decision to transmit the dynamic DL-PRS may have been made more recently than the decision to transmit the configured SPS-PDSCH or CSI-RS. Thus, the later network decision may be given priority over the earlier network decision. In some embodiments, the network may still proceed with configurations that collide in certain occasions (for example, may transmit the configured SPS-PDSCH or CSI-RS), but the UE 104 may not expect to receive the transmissions other than the DL-PRS.

In a second option, treatment of the potential collision between a dynamic DL-PRS and configured CSI-RS may be treated differently than a potential collision between a dynamic DL-PRS and a configured SPS-PDSCH. If there is a potential collision between a dynamic DL-PRS and a configured CSI-RS, the UE 104 may not expect to receive the CSI-RS. Similarly, if there is a potential collision between a dynamic DL-PRS and a configured SPS-PDSCH, the UE 104 may not expect to receive the SPS-PDSCH. However, if the UE 104 does receive the unexpected transmissions, it may consider the receipt of the SPS-PDSCH as an error case, but would not consider the receipt of the CSI-RS as an error case. Thus, in this embodiment, the flexibility of the network to use configurations that cause collision between the dynamic DL-PRS and the SPS-PDSCH may be limited.

In a third option, the base station 108 and UE 104 may treat potential collisions between a dynamic DL-PRS and both configured CSI-RS and configured SPS PDSCH as described in option 2 with respect to the SPS-PDSCH. For example, the UE 104 may not expect a dynamic DL-PRS to collide with either a configured CSI-RS or a configured SPS PDSCH and may treat such a situation as an error case. Thus, in this embodiment, the flexibility of the network to use configurations that cause collision between the dynamic DL-PRS and the CSI-RS or the SPS-PDSCH may be limited.

In another embodiment, a dynamic DL-PRS, triggered by a lower-layer control signal, may potentially collide with a dynamic physical downlink shared channel (PDSCH). In these embodiments, one or more options may be used.

In a first option, the UE 104 may not expect collisions between such dynamic allocations. For example, the UE 104 would consider a collision between a dynamic DL-PRS and a dynamic PDSCH as an error case. Thus, the network may not have flexibility to configure these dynamic allocations in an overlapping manner.

In a second option, the dynamic PDSCH may be prioritized over the dynamic DL-PRS. In this situation, the base station 108 may drop the DL-PRS. In some embodiments, the base station 108 may only drop dynamic DL-PRS occasions on symbols that overlap with the dynamic PDSCH. In other embodiments, the base station 108 may drop the DL-PRS occasions on all the symbols.

In a third option, the dynamic DL-PRS may be prioritized over the dynamic PDSCH. In this situation, the base station 108 may drop the dynamic PDSCH. In some embodiments, the base station 108 may only drop dynamic PDSCH on symbols that overlap with the dynamic DL-PRS. In other embodiments, the base station 108 may drop the DL-PRS occasions on all the symbols.

In some embodiments, in order to handle interference or potential collisions base station 108 may mute some DL-PRS resources. The base station 108 may mute these resources using one or more muting patterns. For example, a first muting pattern may include muting all PRS resources within a muting window; and a second muting pattern may include muting only specific repetitions of a single PRS resource. In some embodiments, the base station 108 may indicate a muting pattern by transmitting lower-layer control signals as described herein. The lower-layer control signals may include lower-layer activation/release signals as discussed herein. In other embodiments, separate lower-layer control signals may be dedicated to providing an indication of a muting pattern. The muting pattern may be one of the two muting patterns discussed above, or may include additional muting patterns. In some embodiments, the muting patterns may be part of a configuration, for example configuration 212, that is referenced by a muting pattern index included in the lower-layer control signal.

In some embodiments, the muting pattern may be associated with a configured muting duration. The muting duration may be part of the initial configuration or may be signaled in the lower-layer control signal. In other embodiments, the muting pattern may be activated and released in a manner similar to that described above with respect to activating and releasing the DL-PRS resources.

Figure 3:
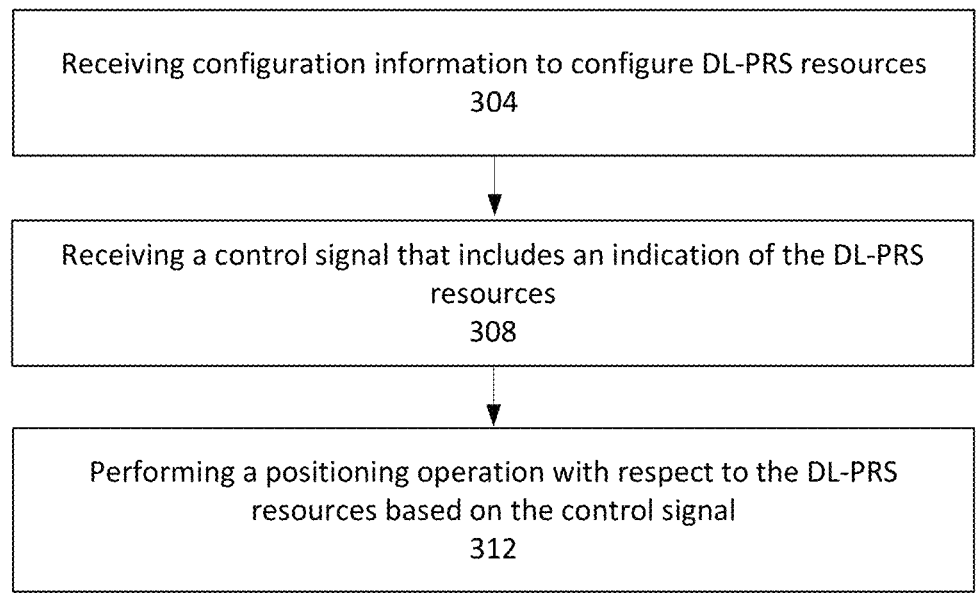
FIG. 3 illustrates an operational flow/algorithmic structure in accordance with some embodiments.

FIG. 3 illustrates an operation flow/algorithmic structure 300 in accordance with some embodiments. The operation flow/algorithmic structure 300 may be performed or implemented by a UE such as, for example, UE 104 or UE 600; or components thereof, for example, baseband processor 604A.

The operation flow/algorithmic structure 300 may include, at 304, receiving configuration information to configure DL-PRS resources. The configuration information may configure a plurality of dynamic DL-PRS resources, with different DL-PRS resources having independent configuration parameters including, for example, time/frequency resources, periodicity, active durations, etc. The configuration information may be specifically configured to one UE or a set of UEs.

In some embodiments, the DL-PRS resources may be organized into one or more resource sets. In some embodiments, DL-PRS resources may belong to more than one DL-PRS resource set. The DL-PRS resources/resource sets as configured by the configuration information may be indexed by a DL-PRS resource index or a DL-PRS resource set index.

The operation flow/algorithmic structure 300 may further include, at 308, receiving a control signal that includes an indication of the DL-PRS resources. In some embodiments, the indication may be an indication of the DL-PRS resource index or DL-PRS resource set index.

The control signal may be a lower-layer control signal such as, for example, UE-specific DCI, GC DCI, or MAC CE signal, that is used to dynamically activate or release DL-PRS resources. In some embodiments, the control signal may further include information to supplement or override portions of the configuration. For example, in some embodiments the control signal may include duration information (either original or updated) that may indicate how long DL-PRS resources are to be activated. For another example, the control signal may include location information such as, for example, an indication of a component carrier, bandwidth part, etc. in which the DL-PRS resources are located.

In some embodiments, the control signal may be DCI that may be identified as a DL-PRS type DCI based on an RNTI used to scramble CRC bits attached to a payload of the DCI. Upon determining the DCI is a DL-PRS type DCI, the UE may interpret fields of the DCI based on a DL-PRS context.

The operation flow/algorithmic structure 300 may further include, at 312, performing a positioning operation with respect to the DL-PRS resources based on the control signal.

In some embodiments, the control signal may be an activation signal. In these embodiments, the positioning operation may include detecting the activation of the DL-PRS resources (for example, transitioning the DL-PRS resources from an inactive state to an active state), measuring the DL-PRS resources, and transmitting a report to a base station based on the measuring of the DL-PRS resources.

In some embodiments, the control signal may be a release signal. In these embodiments, the positioning operation may include detecting the release of the DL-PRS resources (for example, transitioning the DL-PRS resources from an active state to an inactive state).

Figure 4:
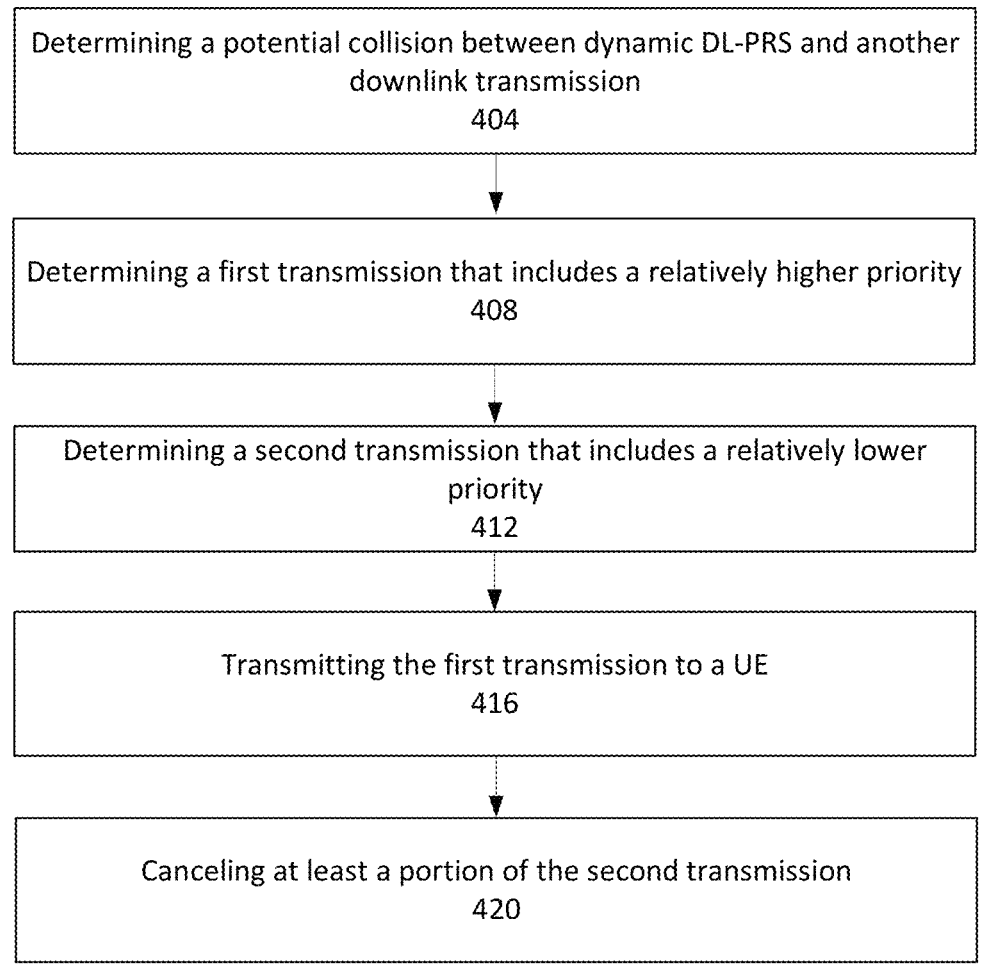
FIG. 4 illustrates another operational flow/algorithmic structure in accordance with some embodiments.

FIG. 4 illustrates an operation flow/algorithmic structure 400 in accordance with some embodiments. The operation flow/algorithmic structure 400 may be performed or implemented by a base station such as, for example, base station 108 or base station 700; or components thereof, for example, baseband processor 704A.

The operation flow/algorithmic structure 400 may include, at 404, detecting a potential collision between dynamic DL-PRS and another downlink transmission. In various embodiments, the other downlink transmission may be a broadcast DL-PRS, an SP-DL-PRS, a CSI-RS, an SPS-PDSCH, or a dynamic PDSCH.

The operation flow/algorithmic structure 400 may further include, at 408, determining a first transmission that includes a relatively higher priority. For example, the base station may determine whether the dynamic DL-PRS or the other downlink transmission is to be considered the first transmission with the relatively higher priority. In some embodiments, the transmission that is associated with the most recent network decision may be considered the higher priority.

The operation flow/algorithmic structure 400 may further include, at 412, determining a second transmission that includes a relatively higher priority. For example, the base station may determine whether the dynamic DL-PRS or the other downlink transmission is to be considered the second transmission with the relatively lower priority.

The operation flow/algorithmic structure 400 may further include, at 416, transmitting the first transmission to a UE.

The operation flow/algorithmic structure 400 may further include, at 420, canceling at least a portion of the second transmission. In some embodiments, only portions of the second transmission that are on symbols that overlap with the first transmission may be canceled. In other embodiments, all symbols of the second transmission may be canceled within a duration of the first transmission.

Figure 5:
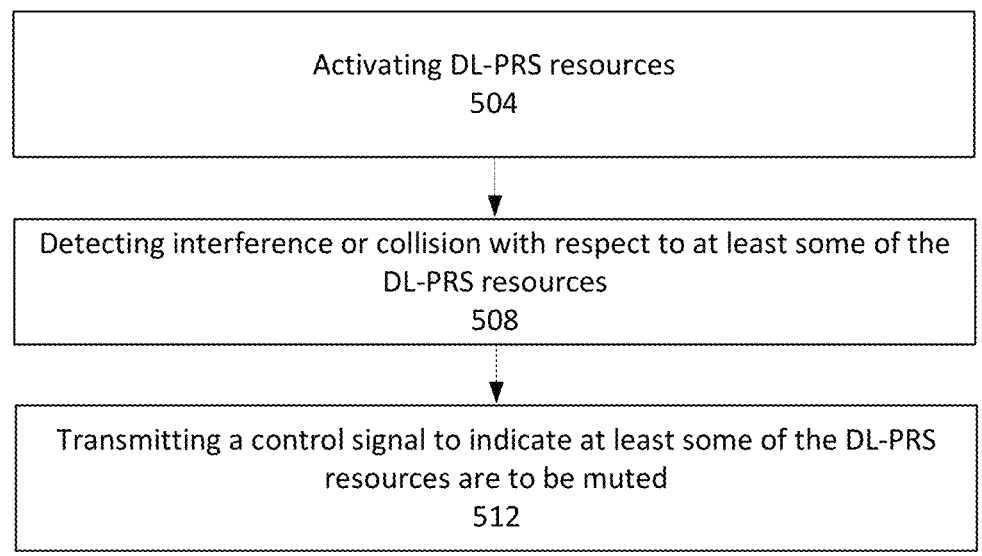
FIG. 5 illustrates another operational flow/algorithmic structure in accordance with some embodiments.

FIG. 5 illustrates an operation flow/algorithmic structure 500 in accordance with some embodiments. The operation flow/algorithmic structure 500 may be performed or implemented by a base station such as, for example, base station 108 or base station 700; or components thereof, for example, baseband processor 704A.

The operation flow/algorithmic structure 500 may include, at 504, activating DL-PRS resources. In these embodiments, the DL-PRS resources may be broadcast, SP, or dynamic DL-PRS resources.

The operation flow/algorithmic structure 500 may further include, at 508, detecting interference or collision with respect to at least some of the DL-PRS resources. For example, in some embodiments the base station may detect the DL-PRS resources are to collide with another downlink transmission as described with respect to FIG. 4, for example.

The operation flow/algorithmic structure 500 may further include, at 512, transmitting a control signal to indicate at least some of the DL-PRS resources are to be muted. In some embodiments, the control signal may be a lower-layer signaling such as, for example, UE-specific DCI, GC DCI, or MAC CE signal. The control signal may identify one or more muting patterns, which may have been previously configured to the UE. In some embodiments, the control signal may further identify a duration of muting of the DL-PRS resources.

Figure 6:
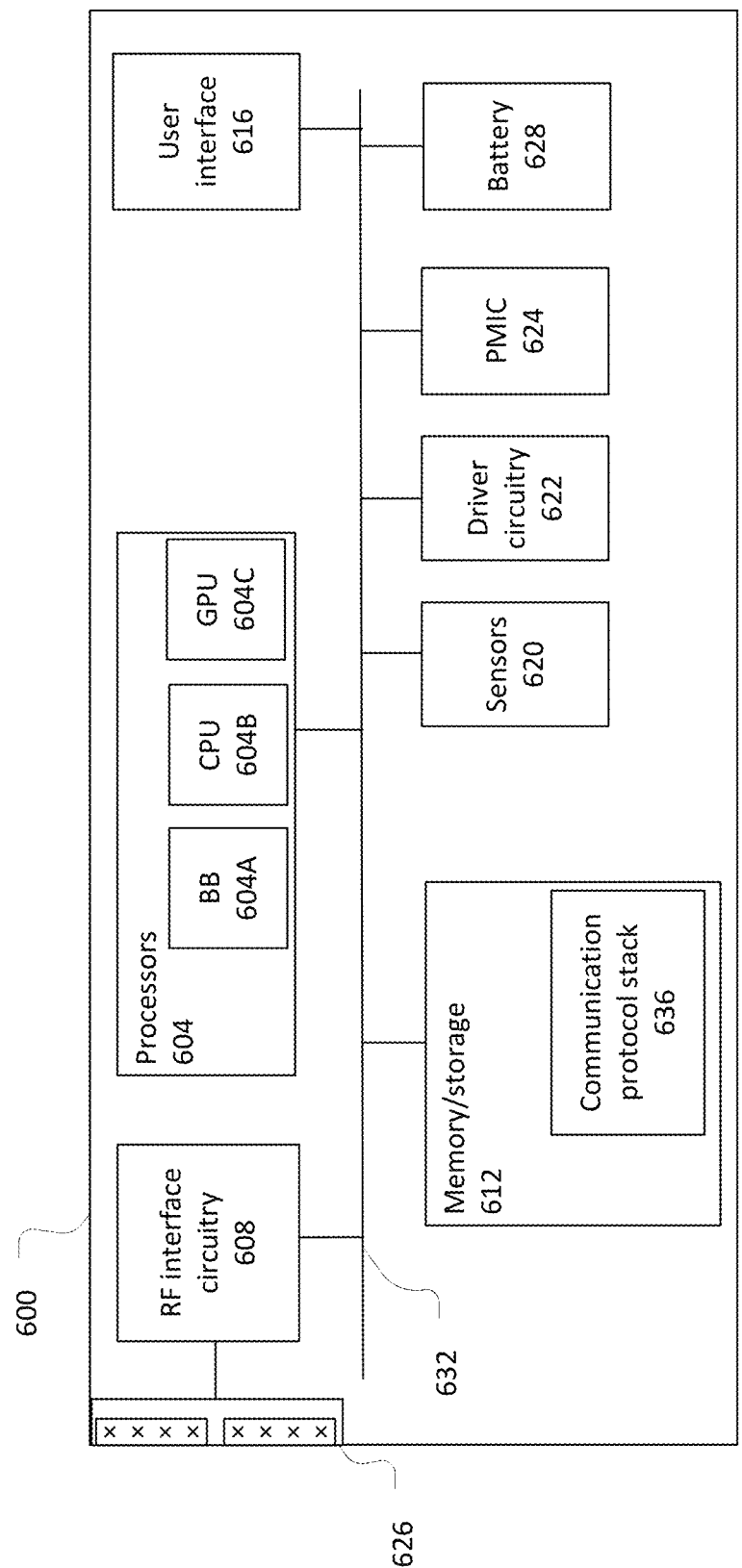
FIG. 6 illustrates a user equipment in accordance with some embodiments.

FIG. 6 illustrates a UE 600 in accordance with some embodiments. The UE 600 may be similar to and substantially interchangeable with UE 64 of FIG. 1.

The UE 600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 600 may include processors 604, RF interface circuitry 608, memory/storage 612, user interface 616, sensors 620, driver circuitry 622, power management integrated circuit (PMIC) 624, antenna structure 626, and battery 628. The components of the UE 600 may be implemented as integrated circuits (ICs), portions thereof, discrete electronic devices, or other modules, logic, hardware, software, firmware, or a combination thereof. The block diagram of FIG. 6 is intended to show a high-level view of some of the components of the UE 600. However, some of the components shown may be omitted, additional components may be present, and different arrangement of the components shown may occur in other implementations.

The components of the UE 600 may be coupled with various other components over one or more interconnects 632, which may represent any type of interface, input/output, bus (local, system, or expansion), transmission line, trace, optical connection, etc. that allows various circuit components (on common or different chips or chipsets) to interact with one another.

The processors 604 may include processor circuitry such as, for example, baseband processor circuitry (BB) 604A, central processor unit circuitry (CPU) 604B, and graphics processor unit circuitry (GPU) 604C. The processors 604 may include any type of circuitry or processor circuitry that executes or otherwise operates computer-executable instructions, such as program code, software modules, or functional processes from memory/storage 612 to cause the UE 600 to perform operations as described herein.

In some embodiments, the baseband processor circuitry 604A may access a communication protocol stack 636 in the memory/storage 612 to communicate over a 3GPP compatible network. In general, the baseband processor circuitry 604A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 608.

The baseband processor circuitry 604A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 612 may include one or more non-transitory, computer-readable media that includes instructions (for example, communication protocol stack 636) that may be executed by one or more of the processors 604 to cause the UE 600 to perform various operations described herein. The memory/storage 612 include any type of volatile or non-volatile memory that may be distributed throughout the UE 600. In some embodiments, some of the memory/storage 612 may be located on the processors 604 themselves (for example, L1 and L2 cache), while other memory/storage 612 is external to the processors 604 but accessible thereto via a memory interface. The memory/storage 612 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 608 may include transceiver circuitry and radio frequency front module (RFEM) that allows the UE 600 to communicate with other devices over a radio access network. The RF interface circuitry 608 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 626 and proceed to filter and amplify (with a low-noise amplifier) the signal. The signal may be provided to a receiver of the transceiver that down-converts the RF signal into a baseband signal that is provided to the baseband processor of the processors 604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 626.

In various embodiments, the RF interface circuitry 608 may be configured to transmit/receive signals in a manner compatible with NR access technologies.

The antenna 626 may include antenna elements to convert electrical signals into radio waves to travel through the air and to convert received radio waves into electrical signals. The antenna elements may be arranged into one or more antenna panels. The antenna 626 may have antenna panels that are omnidirectional, directional, or a combination thereof to enable beamforming and multiple input, multiple output communications. The antenna 626 may include microstrip antennas, printed antennas fabricated on the surface of one or more printed circuit boards, patch antennas, phased array antennas, etc. The antenna 626 may have one or more panels designed for specific frequency bands including bands in FR1 or FR2.

The user interface circuitry 616 includes various input/output (I/O) devices designed to enable user interaction with the UE 600. The user interface 616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 620 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 622 may include software and hardware elements that operate to control particular devices that are embedded in the UE 600, attached to the UE 1100, or otherwise communicatively coupled with the UE 600. The driver circuitry 622 may include individual drivers allowing other components to interact with or control various input/output (I/O) devices that may be present within, or connected to, the UE 600. For example, driver circuitry 622 may include a display driver to control and allow access to a display device, a touchscreen driver to control and allow access to a touchscreen interface, sensor drivers to obtain sensor readings of sensor circuitry 620 and control and allow access to sensor circuitry 620, drivers to obtain actuator positions of electro-mechanic components or control and allow access to the electro-mechanic components, a camera driver to control and allow access to an embedded image capture device, audio drivers to control and allow access to one or more audio devices.

The PMIC 624 may manage power provided to various components of the UE 600. In particular, with respect to the processors 604, the PMIC 624 may control power-source selection, voltage scaling, battery charging, or DC-to-DC conversion.

In some embodiments, the PMIC 624 may control, or otherwise be part of, various power saving mechanisms of the UE 600 including DRX as discussed herein.

A battery 628 may power the UE 600, although in some examples the UE 600 may be mounted deployed in a fixed location, and may have a power supply coupled to an electrical grid. The battery 628 may be a lithium ion battery, a metal-air battery, such as a zinc-air battery, an aluminum-air battery, a lithium-air battery, and the like. In some implementations, such as in vehicle-based applications, the battery 628 may be a typical lead-acid automotive battery.

Figure 7:
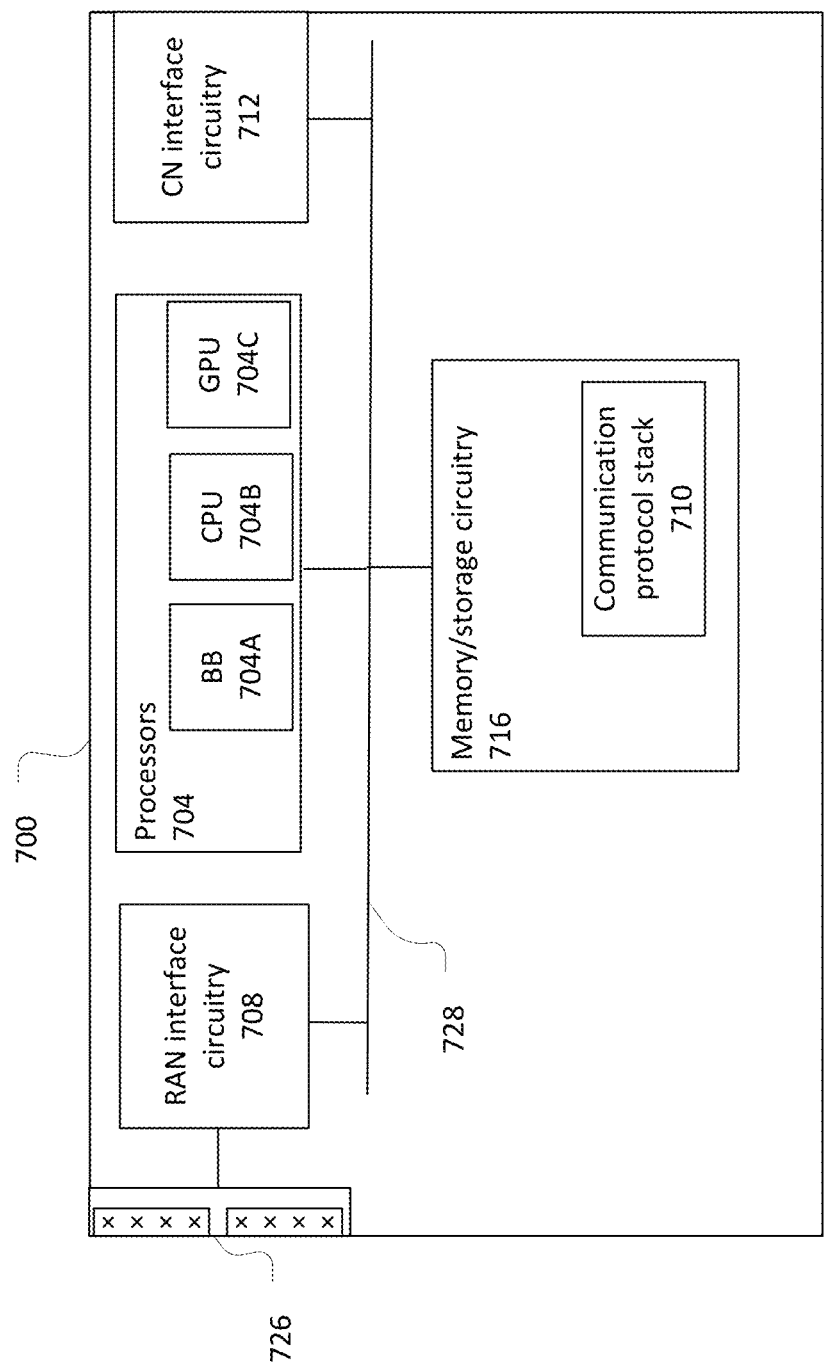
FIG. 7 illustrates a base station in accordance with some embodiments.

FIG. 7 illustrates a gNB 700 in accordance with some embodiments. The gNB node 700 may similar to and substantially interchangeable with base station 108 of FIG. 1.

The gNB 700 may include processors 704, RF interface circuitry 708, core network "CN" interface circuitry 712, memory/storage circuitry 716, and antenna structure 726.

The components of the gNB 700 may be coupled with various other components over one or more interconnects 728.

The processors 704, RF interface circuitry 708, memory/storage circuitry 716 (including communication protocol stack 710), antenna structure 726, and interconnects 728 may be similar to like-named elements shown and described with respect to FIG. 6.

The CN interface circuitry 712 may provide connectivity to a core network, for example, a 5th Generation Core network "5GC" using a 5GC-compatible network interface protocol such as carrier Ethernet protocols, or some other suitable protocol. Network connectivity may be provided to/from the gNB 700 via a fiber optic or wireless backhaul. The CN interface circuitry 712 may include one or more dedicated processors or FPGAs to communicate using one or more of the aforementioned protocols. In some implementations, the CN interface circuitry 712 may include multiple controllers to provide connectivity to other networks using the same or different protocols.

In some embodiments, the gNB 700 may be coupled with TRPs using the antenna structure 726, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a user equipment (UE), the method comprising: receiving configuration information to configure downlink-positioning reference signal (DL-PRS) resources; receiving a control signal that includes an indication of the DL-PRS resources, wherein the control signal is at a media access control (MAC) layer or lower layer; and performing a positioning operation with respect to the DL-PRS resources based on the control signal.

Example 2 may include the method of claim 1 or some other example herein, wherein performing the positioning operation comprises: detecting an activation of the DL-PRS resources; measuring the DL-PRS resources; and transmitting a report to a base station based on the measuring of the DL-PRS resources.

Example 3 may include the method of example 2 or some other example herein, further comprising: determining a length of a window in which the DL-PRS resources are activated based on the control signal or the configuration information.

Example 4 may include the method of example 2 or some other example herein, wherein the indication of the DL-PRS resources comprises an indication of a DL-PRS resource index or a DL-PRS resource set index.

Example 5 may include the method of example 2 or some other example herein, further comprising: configuring, based on the configuration information, the DL-PRS resources in an inactive state; and transitioning the DL-PRS resources from the inactive state to an active state based on detecting the activation of the DL-PRS resources.

Example 6 may include the method of example 2 or some other example herein, further comprising: determining a reference signal received power (RSRP) or reference signal time difference (RSTD) based on said measuring the DL-PRS resources; and transmitting the report based on the RSRP or RSTD.

Example 7 may include the method of example 1 or some other example herein, wherein the configuration information is a UE-specific configuration information to configure one or more UEs, including the UE, with the DL-PRS resources.

Example 8 may include the method of example 1 or some other example herein, wherein the control signal comprises downlink control information (DCI) and the method further comprises: descrambling cyclic-redundancy check (CRC)

bits attached to a payload of the DCI to detect a radio-network temporary identifier (RNTI); determining the DCI is of a DL-PRS type to activate or release DL-PRS resources based on the RNTI; and processing one or more fields of the DCI based on determining the DCI is of the DL-PRS type.

Example 9 may include the method of example 1 or some other example herein, further comprising: transmitting, to a base station, an indication of a minimum period after receipt of a DL-PRS activation signal that the UE is capable of receiving a corresponding DL-PRS; and receiving, in the control signal, an indication of a period after receipt of the control signal that the UE is to receive first occasion of activated DL-PRS resources, wherein the period is equal to or greater than the minimum period.

Example 10 may include the method of example 1 or some other example herein, wherein performing the positioning operation comprises: detecting a release of the DL-PRS resources; and transitioning the DL-PRS resources from an active state to an inactive state.

Example 11 may include the method of example 10 or some other example herein, wherein the indication of the DL-PRS resources comprises an indication of a DL-PRS resource index or a DL-PRS resource set index.

Example 12 may include the method of example 1 or some other example herein, further comprising: transmitting, to a base station, an acknowledgment of the receiving of the control signal, wherein the acknowledgement comprises a media access control (MAC) control element (CE) or physical uplink control channel (PUCCH) transmission.

Example 13 may include the method of example 1 or some other example herein, further comprising: transmitting, to a base station, a capability message to indicate a maximum number of DL PRS resources supported by the UE for reference signal received power (RSRP) or reference signal time difference (RSTD) measurements.

Example 14 may include the method of example 13 or some other example herein, wherein to indicate the maximum number the capability message is to indicate: a first number of DL-PRS resources supported when no dynamic DL-PRS resources are in an active state; a second number of dynamic DL-PRS resources supported in an inactive state; and a third number of dynamic DL-PRS resources supported in an active state.

Example 15 may include the method of example 13 or some other example herein, wherein to indicate the maximum number the capability message is to indicate one number of DL-PRS resources that are supported for broadcast DL-PRS resources and dynamic DL-PRS resources.

Example 16 may include the method of any one of examples 1-15 or some other example herein, wherein the control signal comprises UE-specific downlink control information, group-common DCI, or media access control (MAC) control element (CE) signaling.

Example 17 may include a method of operating a base station (BS), the method comprising: determining a potential collision between a dynamic downlink-positioning reference signal (DL-PRS) and another downlink transmission; determining a first transmission of the dynamic DL-PRS and the other downlink transmission includes a relatively higher priority; determining a second transmission of the dynamic DL-PRS and the other downlink transmission includes a relatively lower priority; transmitting the first transmission to a user equipment (UE); and canceling at least a portion of the second transmission.

Example 18 may include the method of example 17 or some other example herein, wherein the other downlink transmission includes broadcast or semi-persistent DL-PRS, the first transmission is the dynamic DL-PRS, and the method further comprises: cancelling transmission of all symbols of the second transmission or only a set of symbols of the second transmission that overlap with the first transmission.

Example 19 may include the method of example 17 or some other example herein, wherein the other downlink transmission includes a channel state information-reference signal (CSI-RS) or a semi-persistent scheduled (SPS) physical downlink shared channel (PDSCH) transmission, the first transmission is the dynamic DL-PRS, and the method further comprises: dropping transmission of the CSI-RS or the SPS PDSCH transmission.

Example 20 may include the method of example 17 or some other example herein, wherein the other downlink transmission includes a dynamic physical downlink shared channel (PDSCH) transmission, the first transmission is the dynamic DL-PRS, and the method further comprises: dropping transmission of the dynamic PDSCH transmission.

Example 21 may include the method of example 17 or some other example herein, wherein the other downlink transmission includes a dynamic physical downlink shared channel (PDSCH) transmission, the first transmission is the dynamic PDSCH transmission, and the method further comprises: dropping transmission of the dynamic DL-PRS.

Example 22 may include a method of operating a base station, the method comprising: activating downlink-positioning reference signal (DL-PRS) resources; detecting interference with respect to at least some of the DL-PRS resources; and transmitting, based on said detecting interference, a control signal to indicate the at least some of the DL-PRS resources are to be muted, wherein the control signal is at a media access control (MAC) layer or lower layer.

Example 23 may include the method of example 22 or some other example herein, wherein the at least some of the DL-PRS resources comprises all of the DL-PRS resources within a muting window.

Example 24 may include the method of example 22 or some other example herein, wherein the at least some of the DL-PRS resources comprises a specific subset of all of the DL-PRS resources.

Example 25 may include the method of example 22 some other example herein, wherein the DL-PRS resources are broadcast DL-PRS resources or dynamic DL-PRS resources.

Example 26 may include the method of example 22 or some other example herein, wherein the control signal includes an indication of a muting duration for the at least some of the DL-PRS resources.

Example 27 may include an apparatus comprising means to perform one or more elements of a method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, or circuitry to perform one or more elements of a method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 32 may include a signal as described in or related to any of examples 1-26, or portions or parts thereof.

Example 33 may include a datagram, information element, packet, frame, segment, PDU, or message as described in or related to any of examples 1-26, or portions or parts thereof, or otherwise described in the present disclosure.

Example 34 may include a signal encoded with data as described in or related to any of examples 1-26, or portions or parts thereof, or otherwise described in the present disclosure.

Example 35 may include a signal encoded with a datagram, IE, packet, frame, segment, PDU, or message as described in or related to any of examples 1-26, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of examples 1-26, or portions thereof.

Example 37 may include a computer program comprising instructions, wherein execution of the program by a processing element is to cause the processing element to carry out the method, techniques, or process as described in or related to any of examples 1-26, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media (NTCRM) having instructions that, when executed, cause processing circuitry to:
receive configuration information to configure downlink-positioning reference signal (DL-PRS) resources;
receive a control signal that includes an indication of the DL-PRS resources, wherein the control signal is at a media access control (MAC) layer or a layer below the MAC layer; and
perform a positioning operation with respect to the DL-PRS resources based on the control signal.

2. The one or more NTCRM of claim 1, wherein to perform the positioning operation, the processing circuitry is to:
detect an activation of the DL-PRS resources;
measure the DL-PRS resources to obtain measurements; and
transmit a report to a base station based on the measurements.

3. The one or more NTCRM of claim 2, wherein the instructions, when executed, further cause the processing circuitry to:
determine a length of a window in which the DL-PRS resources are activated based on the control signal or the configuration information.

4. The one or more NTCRM of claim 2, wherein the instructions, when executed, further cause the processing circuitry to:
configure, based on the configuration information, the DL-PRS resources in an inactive state; and
transition the DL-PRS resources from the inactive state to an active state based on the activation of the DL-PRS resources.

5. The one or more NTCRM of claim 2, wherein the instructions, when executed, further cause the processing circuitry to:
determine a reference signal received power (RSRP) or reference signal time difference (RSTD) based on the measurements; and
transmit the report based on the RSRP or RSTD.

6. The one or more NTCRM of claim 1, wherein the indication of the DL-PRS resources comprises an indication of a DL-PRS resource index or a DL-PRS resource set index.

7. The one or more NTCRM of claim 1, wherein the configuration information is a user equipment (UE)-specific configuration information to configure one or more UEs with the DL-PRS resources.

8. The one or more NTCRM of claim 1, wherein the control signal comprises downlink control information (DCI) and the instructions, when executed, further cause the processing circuitry to:
descramble cyclic-redundancy check (CRC) bits attached to a payload of the DCI to detect a radio-network temporary identifier (RNTI);
determine the DCI is of a DL-PRS type to activate or release DL-PRS resources based on the RNTI; and
process one or more fields of the DCI based on determination that the DCI is of the DL-PRS type.

9. The one or more NTCRM of claim 1, wherein the instructions, when executed, further cause the processing circuitry to:
transmit, to a base station, an indication of a minimum period after receipt of a DL-PRS activation signal that a user equipment is capable of receiving a corresponding DL-PRS; and
receive, in the control signal, an indication of a period after receipt of the control signal that a user equipment is to receive first occasion of activated DL-PRS resources, wherein the period is equal to or greater than the minimum period.

10. The one or more NTCRM of claim 1, wherein the instructions, when executed, further cause the processing circuitry to:
transmit, to a base station, an acknowledgment of receipt of the control signal, wherein the acknowledgement comprises a media access control (MAC) control element (CE) or physical uplink control channel (PUCCH) transmission.

11. The one or more NTCRM of claim 1, wherein the instructions, when executed, further cause the processing circuitry to:
   transmit, to a base station, a capability message to indicate a maximum number of DL PRS resources supported by a user equipment for reference signal received power (RSRP) or reference signal time difference (RSTD) measurements,
   wherein to indicate the maximum number the capability message is to indicate: a first number of DL-PRS resources supported when no dynamic DL-PRS resources are in an active state, a second number of dynamic DL-PRS resources supported in an inactive state, and a third number of dynamic DL-PRS resources supported in an active state; or one number of DL-PRS resources that are supported for broadcast DL-PRS resources and dynamic DL-PRS resources.

12. An apparatus to be implemented in a base station, the apparatus comprising:
   memory to store priority information; and
   processing circuitry, coupled with the memory, to:
      determine a potential collision between a dynamic downlink-positioning reference signal (DL-PRS) and another downlink transmission;
      determine, based on the priority information, a first transmission of the dynamic DL-PRS and the other downlink transmission includes a relatively higher priority;
      determine, based on the priority information, a second transmission of the dynamic DL-PRS and the other downlink transmission includes a relatively lower priority;
      transmit the first transmission to a user equipment (UE); and
      cancel at least a portion of the second transmission.

13. The apparatus of claim 12, wherein the other downlink transmission includes broadcast or semi-persistent DL-PRS, the first transmission is the dynamic DL-PRS, and the processing circuitry is further to: cancel transmission of all symbols of the second transmission or only a set of symbols of the second transmission that overlap with the first transmission.

14. The apparatus of claim 12, wherein the other downlink transmission includes a channel state information-reference signal (CSI-RS) or a semi-persistent scheduled (SPS) physical downlink shared channel (PDSCH) transmission, the first transmission is the dynamic DL-PRS, and the processing circuitry is further to: drop transmission of the CSI-RS or the SPS PDSCH transmission.

15. The apparatus of claim 12, wherein the other downlink transmission includes a dynamic physical downlink shared channel (PDSCH) transmission, the first transmission is the dynamic DL-PRS, and the processing circuitry is further to: drop transmission of the dynamic PDSCH transmission.

16. The apparatus of claim 12, wherein the other downlink transmission includes a dynamic physical downlink shared channel (PDSCH) transmission, the first transmission is the dynamic PDSCH transmission, and the processing circuitry is further to:
   drop transmission of the dynamic DL-PRS.

17. A method of operating a base station, the method comprising:
   activating downlink-positioning reference signal (DL-PRS) resources;
   detecting interference with respect to at least some of the DL-PRS resources; and
   transmitting, based on said detecting interference, a control signal to indicate the at least some of the DL-PRS resources are to be muted, wherein the control signal is at a media access control (MAC) layer or lower layer.

18. The method of claim 17, wherein the at least some of the DL-PRS resources comprises: all of the DL-PRS resources within a muting window; or a specific subset of all of the DL-PRS resources.

19. The method of claim 17, wherein the DL-PRS resources are broadcast DL-PRS resources or dynamic DL-PRS resources.

20. The method of claim 17, wherein the control signal includes an indication of a muting duration for the at least some of the DL-PRS resources.

* * * * *